United States Patent
Ghose et al.

(10) Patent No.: US 11,244,148 B2
(45) Date of Patent: Feb. 8, 2022

(54) AUTOMATED DETECTION OF UNAUTHORIZED ACCESS TO DEVICE SCREENS USING MACHINE LEARNING FACIAL RECOGNITION TECHNIQUES

(71) Applicant: Dell Products L.P., Round Rock, TX (US)

(72) Inventors: Chandroma Ghose, Bangalore (IN); Manjunath Patil, Bangalore (IN); Madhuri Dwarakanath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 16/731,358

(22) Filed: Dec. 31, 2019

(65) Prior Publication Data

US 2021/0200998 A1    Jul. 1, 2021

(51) Int. Cl.
| | |
|---|---|
| *G06K 9/00* | (2006.01) |
| *G06K 9/62* | (2006.01) |
| *G06N 20/00* | (2019.01) |
| *H04L 29/08* | (2006.01) |

(52) U.S. Cl.
CPC ..... *G06K 9/00288* (2013.01); *G06K 9/00248* (2013.01); *G06K 9/00281* (2013.01); *G06K 9/6217* (2013.01); *G06N 20/00* (2019.01); *H04L 67/10* (2013.01)

(58) Field of Classification Search
CPC ............ G06K 9/00288; G06K 9/00281
See application file for complete search history.

(56) References Cited

U.S. PATENT DOCUMENTS 9,691,361 B2 *   6/2017  Basson ................. G06F 21/554
10,939,120 B1 *  3/2021  Siminoff .............. G06K 9/6202

OTHER PUBLICATIONS

Wikipedia, Eigenface, https://en.wikipedia.org/w/index.php?title=Eigenface&oldid=929501540, Dec. 6, 2019.
Turk et al., Eigenfaces for Recognition, Journal of Cognitive Neuroscience, vol. 3, No. 1, 1991.
Dwivedi, D., Face Detection for Beginners, Towards Data Science, https://towardsdatascience.com/face-detection-for-beginners-e58e8f21aad9, Apr. 27, 2018.

* cited by examiner

*Primary Examiner* — Tuan H Nguyen
(74) *Attorney, Agent, or Firm* — Ryan, Mason & Lewis, LLP

(57) ABSTRACT

Methods, apparatus, and processor-readable storage media for automated detection of unauthorized access to device screens using machine learning facial recognition techniques are provided herein. An example computer-implemented method includes automatically detecting, using one or more machine learning facial recognition techniques, at least a portion of at least one face within a given proximity of a user device; automatically performing a comparison, using one or more machine learning facial recognition techniques, of the detected portion of the at least one face with facial images attributed to a set of trusted individuals; and automatically performing security-related actions with respect to the user device upon determining, based at least in part on the comparison, that the detected portion of the at least one face exhibits at least a threshold level of distinctiveness relative to each of the facial images attributed to the set of trusted individuals.

20 Claims, 9 Drawing Sheets

AUTOMATED DETECTION OF UNAUTHORIZED ACCESS TO DEVICE SCREENS USING MACHINE LEARNING FACIAL RECOGNITION TECHNIQUES

FIELD

The field relates generally to information processing systems, and more particularly to techniques for providing security in such systems.

BACKGROUND

Security risks associated with user devices can include a practice commonly referred to as shoulder surfing, wherein unauthorized individuals view a given user device without the knowledge and/or permission of the user of the user device. Certain situations can present increased vulnerability to shoulder surfing risks, such as situations involving individuals using user devices in crowded public spaces, individuals viewing confidential data on user devices, individuals working on sensitive projects on user devices, etc. Conventional device security approaches, however, face challenges in efficiently identifying unauthorized shoulder surfers and preventing unauthorized shoulder surfers from viewing sensitive and/or confidential data from user devices.

SUMMARY

Illustrative embodiments of the disclosure provide techniques for automated detection of unauthorized access to device screens using machine learning facial recognition techniques. An exemplary computer-implemented method includes automatically detecting, using one or more machine learning facial recognition techniques, at least a portion of at least one face within a given proximity of a user device. Additionally, such a method includes automatically performing a comparison, using one or more machine learning facial recognition techniques, of the detected portion of the at least one face with one or more facial images attributed to a set of one or more trusted individuals. Further, such a method includes automatically performing one or more security-related actions with respect to the user device upon determining, based at least in part on the comparison, that the detected portion of the at least one face exhibits at least a threshold level of distinctiveness relative to each of the one or more facial images attributed to the set of one or more trusted individuals.

Illustrative embodiments can provide significant advantages relative to conventional device security approaches. For example, challenges associated with identifying unauthorized shoulder surfers are overcome in one or more embodiments through the implementation of machine learning facial recognition techniques to automatically detect unauthorized individuals. Additionally, challenges associated with preventing unauthorized shoulder surfers from viewing sensitive and/or confidential data are overcome in one or more embodiments through the generation and implementation of a secure view via a user device screen, as well as through the automatic implementation of one or more security-related actions upon detection of an unauthorized individual.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
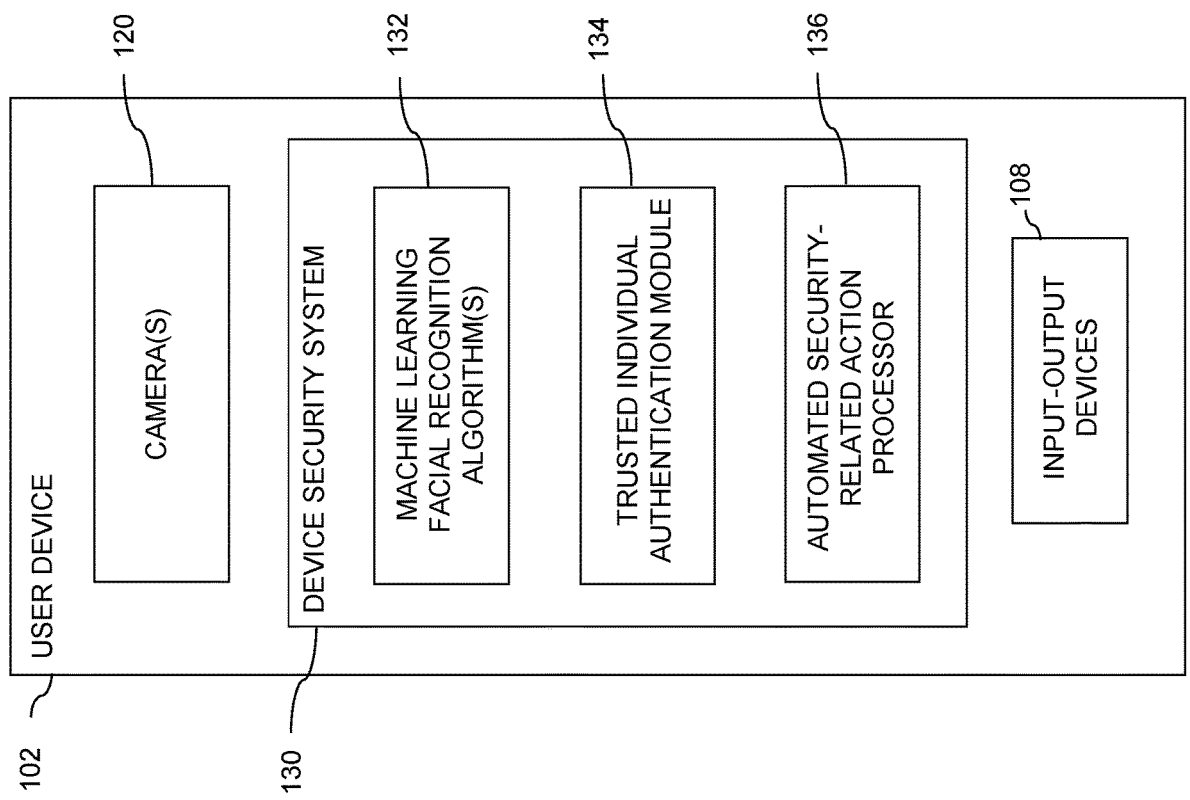
FIG. 1 shows a user device configured for automated detection of unauthorized access to device screens using machine learning facial recognition techniques in an illustrative embodiment.

FIG. 1 shows user device 102 configured in accordance with an illustrative embodiment. In at least one embodiment, one or more such user devices 102 can be coupled to a network (e.g., as part of a larger information processing system). However, at least one embodiment includes execution of one or more of the techniques detailed herein within a single user device 102 that is not coupled to any network and/or any additional user devices.

Such a user device 102, as depicted in FIG. 1, can encompass, for example, a mobile telephone, a laptop computer, a tablet computer, a desktop computer or other type of computing device. Such devices are examples of what are more generally referred to herein as "processing devices." Some of these processing devices are also generally referred to herein as "computers."

The user device 102 in some embodiments comprises respective computers associated with a particular company, organization or other enterprise. Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

In one or more embodiments, a network is assumed to comprise a portion of a global computer network such as the Internet, although other types of networks can be part of an information processing system (that includes one or more user devices 102), including a wide area network (WAN), a local area network (LAN), a satellite network, a telephone or cable network, a cellular network, a wireless network such as a Wi-Fi or WiMAX network, or various portions or combinations of these and other types of networks. In one or more embodiments, an information processing system including one or more user devices 102 comprises combinations of multiple different types of networks, each comprising processing devices configured to communicate using internet protocol (IP) or other related communication protocols.

As also noted herein, one or more user devices 102 can have an associated memory configured to store data pertaining to facial recognition data, which comprise, for example, image data pertaining to faces attributed to trusted individuals (as designated by one or more users of the user device 102).

The memory in one or more embodiments can be implemented using one or more storage systems associated with user device 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also, in one or more embodiments, the user device 102 includes input-output devices 108, which illustratively comprise one or more keyboards, displays or other types of input-output devices in any combination. Such input-output devices can be used, for example, to support one or more user interfaces to user device 102, as well as to support communication between user device 102 and other related systems and devices not explicitly shown.

Additionally, as depicted in FIG. 1, the user device 102 includes one or more cameras 120, which can be built-in and/or resident on the user device 102, or can be external and linked to the user device (e.g., via a wired or wireless connection).

Each user device 102 in the FIG. 1 embodiment is assumed to be implemented using at least one processing device. Each such processing device generally comprises at least one processor and an associated memory, and implements one or more functional modules for controlling certain features of the user device 102.

More particularly, user device 102 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the user device 102 to communicate over a network with one or more other systems and/or user devices, and illustratively comprises one or more conventional transceivers.

The user device 102 further comprises a device security system 130, which includes machine learning facial recognition algorithm(s) 132, a trusted individual authentication module 134, and an automated security-related action processor 136.

It is to be appreciated that this particular arrangement of modules 130, 132, 134 and 136 illustrated in the user device 102 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the device security system 130 and/or modules 132, 134 and 136 may be implemented at least in part in the form of software that is stored in memory and executed by a processor.

It is to be understood that the particular set of elements shown in FIG. 1 for automated detection of unauthorized access to device screens using machine learning facial recognition techniques involving at least one user device 102 is presented by way of illustrative example only, and in other embodiments additional or alternative elements may be used. Thus, another embodiment includes additional or alternative systems, devices and other network entities, as well as different arrangements of modules and other components.

An exemplary process utilizing device security system 130 and/or modules 132, 134 and 136 of an example user device 102 will be described in more detail with reference to the flow diagram of FIG. 6.

Accordingly, at least one embodiment of the invention includes utilizing a user device camera (e.g., an inbuilt user device camera) and automatically detecting the presence of an unauthorized individual using machine learning facial recognition techniques, and preventing such an individual from viewing one or more contents on the screen of the user device. For example, in such an embodiment, when the camera detects any untrusted and/or unauthorized individual, a modified and/or secure view is displayed on the screen of the user device.

By way of illustration and not limitation, generating and displaying such a modified and/or secure view can include one or more of the following example implementations. For instance, in a situation wherein the user of the user device is running any audio and/or audio-visual applications on the user device, such applications are paused and/or stopped, and a modified and/or secure view of the user device screen is displayed. Via such a modified and/or secure view, users can launch one or more specific (user-configurable) applications (as long as such applications do not affect the already-running applications on the previous/original view). Additionally, in one or more embodiments, the user of the user device can manually return the screen of the user device back to the previous/original view (from the modified and/or secure view) via one or more user inputs (e.g., by pressing the ESC key on a keyboard of the user device). Further, at least one embodiment includes automatically returning the screen of the user device back to the previous/original view (from the modified and/or secure view) upon failing to detect an unauthorized individual for a given length of time.

As detailed herein, one or more aspects of the techniques for automated detection of unauthorized access to device screens using machine learning facial recognition are user-configurable. For example, a user can select which applications he or she wishes to monitor and/or hide from the view of an unauthorized individual. Additionally, a user can create and/or modify a list of trusted individuals (that is, individuals from whom the user of the user device does not wish to hide the user-configurable contents of the screen of the user device) against which machine learning facial recognition techniques compare detected facial image data. Accordingly, one or more embodiments includes taking no security-based action when facial image data associated with an individual on the trusted individual list is detected.

Additionally, in at least one embodiment, a face is considered detected (and at least one comparison algorithm is triggered for execution) when at least a given percentage (e.g., 60%) of the face is mapped (by one or more machine learning facial recognition algorithms). Also, in such an embodiment, a face is considered detected (and at least one comparison algorithm is triggered for execution) when the face (or individual associated therewith) is determined to be stationed for at least a minimum duration of time (e.g., five seconds). By way merely of example and illustration, assume that X is the user of the user device and Y is an unauthorized individual. In such an example, if more than 60% (the user-configured threshold) of s face is detected, and Y s face is detected (by a camera associated with the user device) as facing and/or looking at X's user device for more than five seconds (the user-configured threshold), then at least one embodiment will include detecting Y s presence, comparing the facial image data associated with Y's detection, and displaying a modified and/or secure view via the screen of the user device (upon determining that Y is not on the list of trusted individuals). Additionally, in such embodiments, such mapping percentage and temporal requirement parameters can be configured as per the user's requirements and/or specifications.

Figure 2:
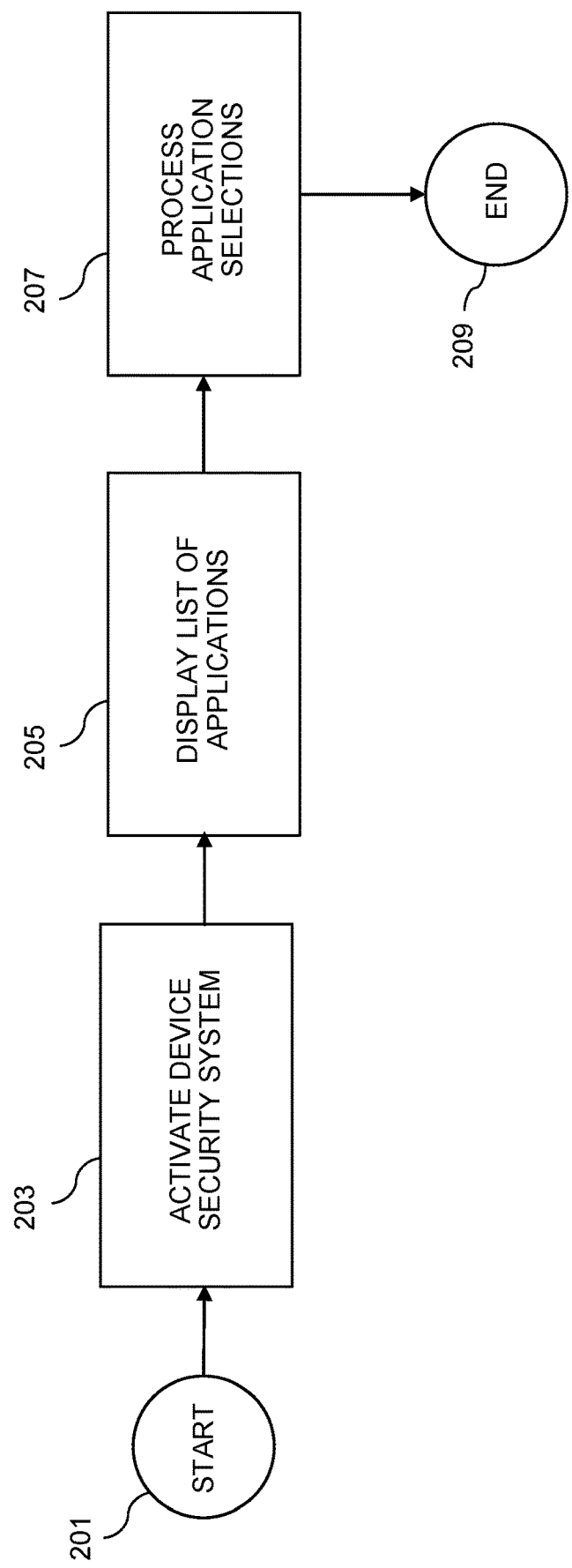
FIG. 2 shows an example workflow for customizing selection of applications to be monitored in an illustrative embodiment.

FIG. 2 shows an example workflow for customizing selection of applications to be monitored in an illustrative embodiment. By way of illustration, the workflow starts at step 201, and the device security system is activated in step 203. Additionally a list of applications is displayed in step 205, application selections are processed in step 207, and the workflow ends in step 209. Accordingly, in one or more embodiments, when a user initiates and/or launches a software application encompassing the techniques detailed herein, a list is displayed on the user device wherein the user can select one or more applications to be monitored. For example, the user may want to monitor a web browser application and an email client, but not a word processing application. In such an embodiment, the user-selected applications can also receive different (user-configurable) treatment in connection with the modified and/or secure view and/or one or more other security-related actions.

Figure 3A:
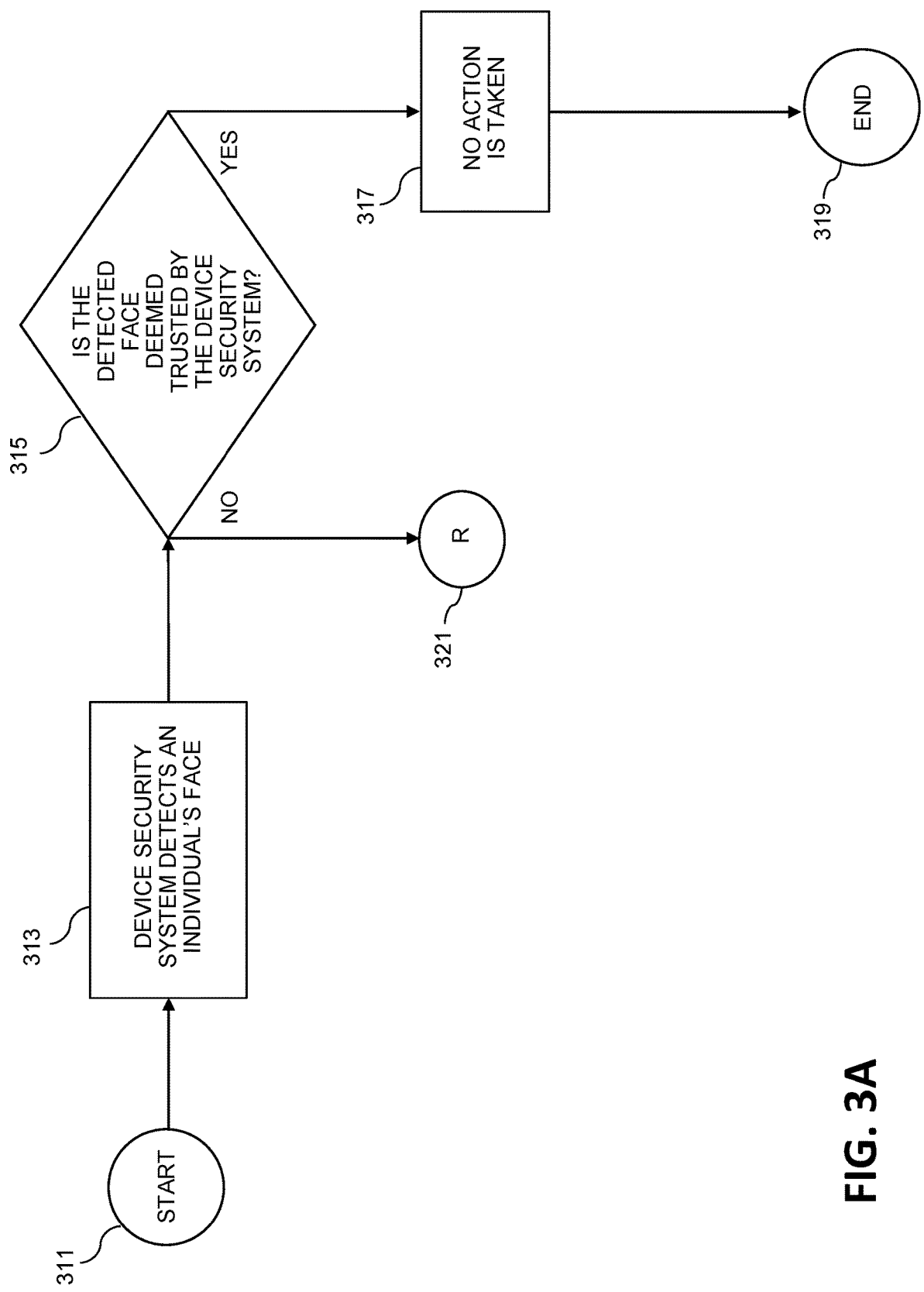
FIG. 3A and FIG. 3B show an example workflow for automatically detecting an individual's presence in an illustrative embodiment.
Figure 3B:
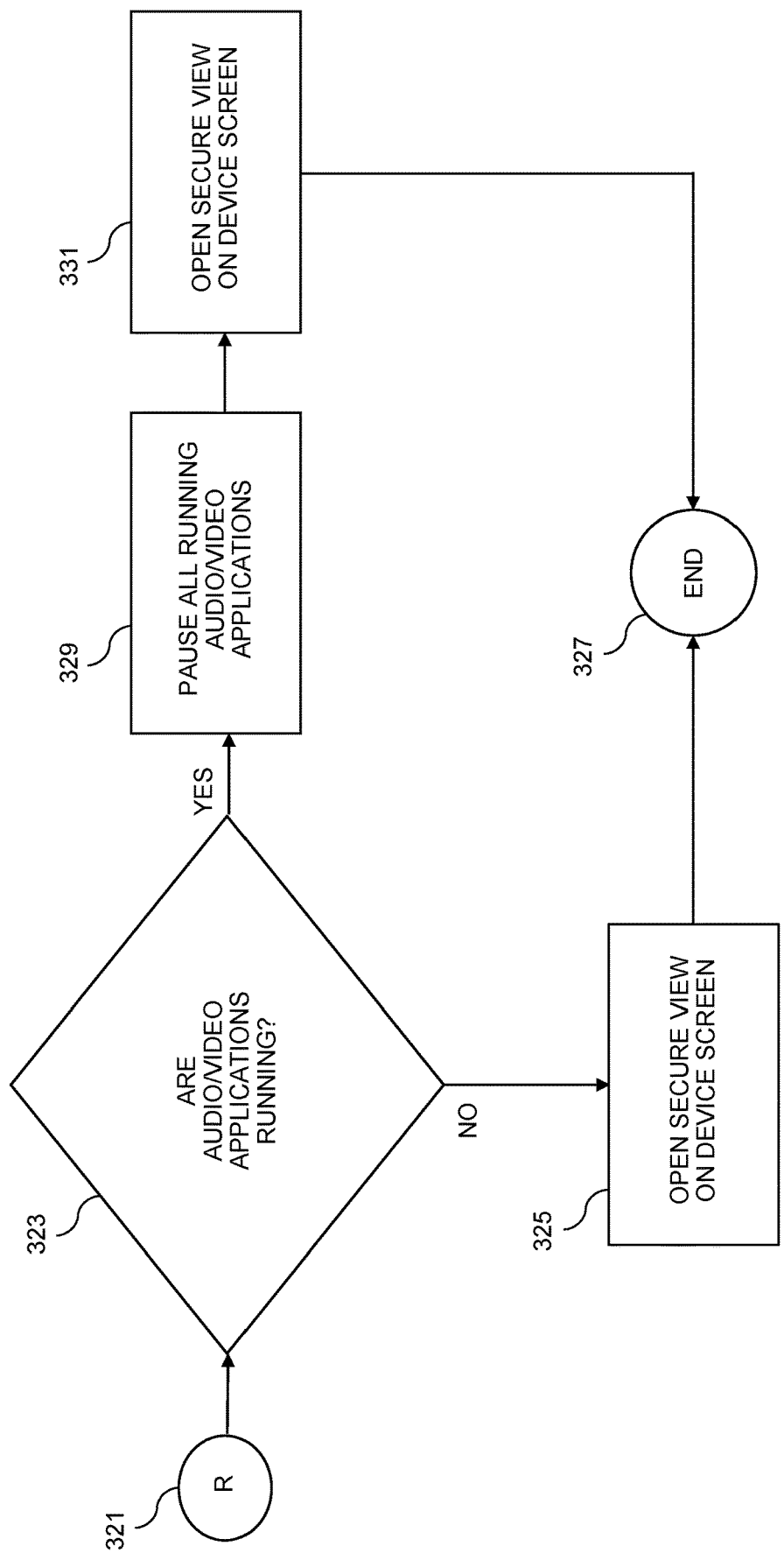

FIG. 3A and FIG. 3B show an example workflow for automatically detecting an individual's presence in an illustrative embodiment. By way of illustration, FIG. 3A starts the workflow in step 311, and in step 313, the device security system detects an individual's face. In step 315, a determination is made as to whether the detected face is deemed trusted by the device security system (e.g., the facial image data associated with the detected face are compared to facial image data associated with a list of trusted individuals). If yes (that is, the detected face is deemed to be trusted), then the workflow continues to step 317 wherein no action (e.g., security-related action) is taken, and the workflow ends at step 319. If no (that is, the detected face is not deemed to be trusted), then the workflow continues to step 321, and then proceeds to the steps illustrated in FIG. 3B.

From step 321, FIG. 3B depicts the workflow continuing to step 323, at which a determination is made as to whether any audio and/or video applications are running on the user device. If no (that is, no audio and/or video applications are running on the user device), the workflow continues to step 325 wherein a secure view is opened and/or displayed on the screen of the user device, and then the workflow ends at step 327. If yes (that is, one or more audio and/or video applications are running on the user device), all such audio and/or video applications are paused and/or stopped in step 329, a secure view is opened and/or displayed on the screen of the user device in step 331, and then the workflow ends at step 327.

Figure 4:
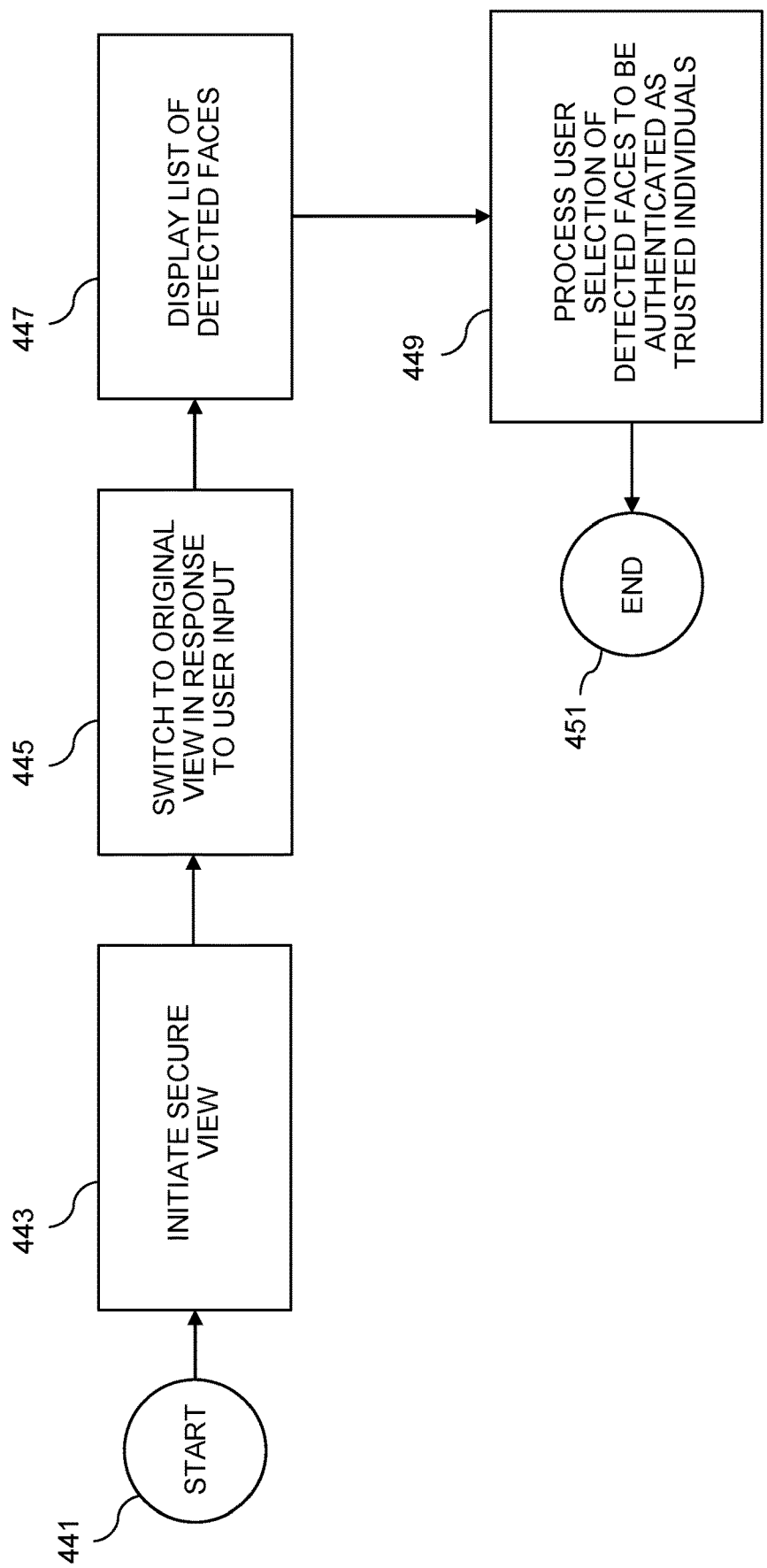
FIG. 4 shows an example workflow for restoring an original screen view in an illustrative embodiment.

FIG. 4 shows an example workflow for restoring an original screen view in an illustrative embodiment. By way of illustration, the workflow starts at step 441, and a secure view is initiated (via the screen of the user device) in step 443. Subsequently, in step 445, a switch is made from the secure view to the original and/or previous view in response to one or more user inputs, and in step 447, a list of detected faces is displayed on the screen of the user device. Additionally, in step 449, a user selection of one or more of the displayed detected faces is processed as trusted faces (e.g., faces to be added to the user's list of trusted individuals), and then the workflow ends at step 451.

Accordingly, in at least one embodiment, after the user has switched to the original/previous view of the user device screen, a list of faces detected by the camera and machine learning facial recognition techniques is displayed to the user. For example, consider a use case wherein person X is the user (of the user device), and person Y and person S are two new faces detected by the camera and machine learning facial recognition techniques. Assume in this example that person Y and person S are unauthorized individuals (that is, neither person Y nor person S is on the user's list of trusted individuals). Consequently, because the detected individuals (that is, person Y and person 5) are unauthorized individuals, a modified and/or secure view is generated for the user device and displayed via the user device screen. Further, in such an example use case, once person X (i.e., the user of the user device) restores the user device screen to the original and/or previous view, a list is generated and displayed that person Y and person S were detected. Subsequently, person X can manually select person Y and/or person S (or neither) to add to the user's list of trusted individuals.

Figure 5:
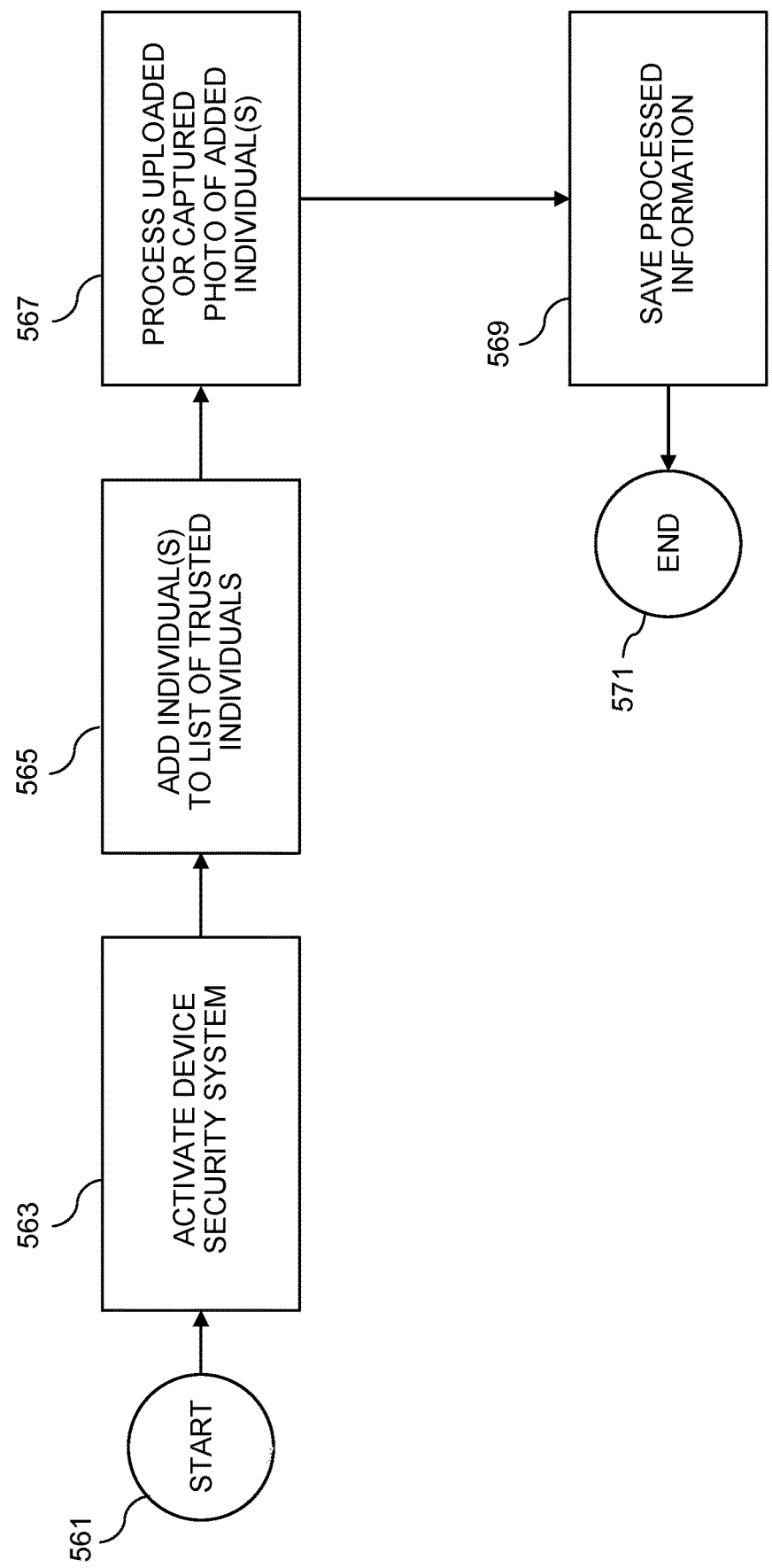
FIG. 5 shows an example workflow for adding one or more individuals to a list of trusted individuals in an illustrative embodiment.

FIG. 5 shows an example workflow for adding one or more individuals to a list of trusted individuals in an illustrative embodiment. By way of illustration, the workflow starts at step 561, and the device security system is activated at step 563. Subsequently, one or more individuals are added (in response to user input) to the user's list of trusted individuals in step 565, and uploaded and/or captured photos of (the face(s) of) the one or more added individuals are processed in step 567. Further, the processed information is saved and/or stored in step 569, and the workflow ends at step 571.

Accordingly, in at least one embodiment, the user (of the user device) can manually add or modify information (e.g., photos) about new and/or existing trusted individuals. When the user adds one or more individuals to the list of trusted individuals, then a modified and/or secure view is not generated and/or displayed (via the user device) in response to the detection of such individuals with respect to the user device and the detection parameters detailed herein in accordance with one or more embodiments.

Figure 6:
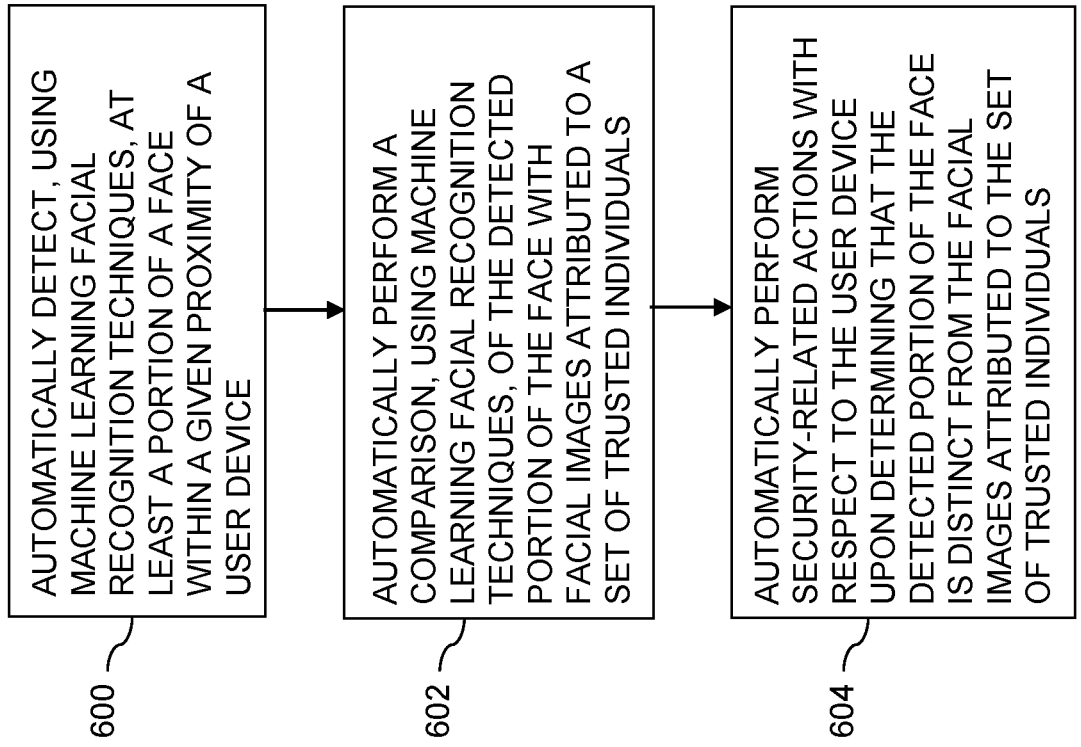
FIG. 6 is a flow diagram of a process for automated detection of unauthorized access to device screens using machine learning facial recognition techniques in an illustrative embodiment.

FIG. 6 is a flow diagram of a process for automated detection of unauthorized access to device screens using facial recognition techniques in an illustrative embodiment. It is to be understood that this particular process is only an example, and additional or alternative processes can be carried out in other embodiments.

In this embodiment, the process includes steps 600 through 604. These steps are assumed to be performed by user device 102 utilizing modules 132, 134 and 136 of device security system 130.

Step 600 includes automatically detecting, using one or more machine learning facial recognition techniques, at least a portion of at least one face within a given proximity of a user device. In at least one embodiment, automatically detecting includes automatically detecting at least a portion of at least one face upon mapping, using the one or more machine learning facial recognition techniques, at least a user-configurable percentage of the at least one face. Additionally, in one or more embodiments, automatically detecting includes automatically detecting at least a portion of at least one face upon observing at least a portion of the at least one face for at least a user-configurable amount of time.

Step 602 includes automatically performing a comparison, using one or more machine learning facial recognition techniques, of the detected portion of the at least one face with one or more facial images attributed to a set of one or more trusted individuals.

In at least one embodiment, the one or more machine learning facial recognition techniques include at least one Eigenface-based technique. In one or more embodiments, example Eigenface-based techniques employed in connection with facial recognition can include techniques such as the ones described in, for example, "Eigenfaces for Recognition," authored by Turk et al. and published in the Journal of Cognitive Neuroscience (Volume 3, No. 1, 1991), as well as "Face Detection For Beginners," authored by Divyansh Dwivedi and published in Towards Data Science on Apr. 27, 2018, both of which are incorporated by reference herein in their entirety.

Also, in one or more embodiments, the one or more machine learning facial recognition techniques used in automatically detecting the at least a portion of at least one face within the given proximity of the user device differ from the one or more machine learning facial recognition techniques used in automatically performing the comparison. Alternatively, in one or more embodiments, the one or more machine learning facial recognition techniques used in automatically detecting the at least a portion of at least one face within the given proximity of the user device include the same one or more machine learning facial recognition techniques used in automatically performing the comparison.

Step 604 includes automatically performing one or more security-related actions with respect to the user device upon determining, based at least in part on the comparison, that the detected portion of the at least one face is distinct from the one or more facial images attributed to the set of one or more trusted individuals. In one or more embodiments, determining that the detected portion of the at least one face is distinct from the one or more facial images attributed to the set of one or more trusted individuals includes determining that the detected portion of the at least one face exhibits at least a threshold level of distinctiveness relative to each of the one or more facial images attributed to the set of one or more trusted individuals. It is to be appreciated that, in one or more embodiments, similar processing operations can include determinations based on threshold levels of similarity. Additionally, in at least one embodiment, the noted threshold(s) can vary based on various configuration parameters.

Also, in at least one embodiment, automatically performing the one or more security-related actions includes generating a secure view and displaying the secure view via a screen of the user device. In such an embodiment, generating the secure view includes deactivating one or more user-configurable applications, enabling execution of one or more user-configurable applications, and/or enabling modified execution of one or more user-configurable applications in accordance with one or more user instructions.

Also, in at least one embodiment, automatically performing the one or more security-related actions includes pausing one or more audio-visual applications executing on the user device and/or stopping one or more audio-visual applications executing on the user device, as well as pausing one or more audio applications executing on the user device and/or stopping one or more audio applications executing on the user device.

The techniques depicted in FIG. 6 can also include, in one or more embodiments, deactivating the secure view and removing the secure view from the screen of the user device in response to one or more user actions. Further, in at least one embodiment, the techniques depicted in FIG. 6 can also include modifying the set of one or more trusted individuals based at least in part on user input.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to use machine learning facial recognition techniques to auto-detect unauthorized individuals within a given proximity to a user device screen. These and other embodiments can effectively provide user-configurable security solutions with respect to shoulder surfing instances.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Additionally, in one or more embodiments, at least portions of an information processing system encompassing one or more user devices 102 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within an information processing system (e.g., a system including one or more user devices 102). For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of an information processing system (e.g., a system including one or more user devices 102), these platforms may also be used to implement at least portions of other information processing systems in other embodiments.

Figure 7:
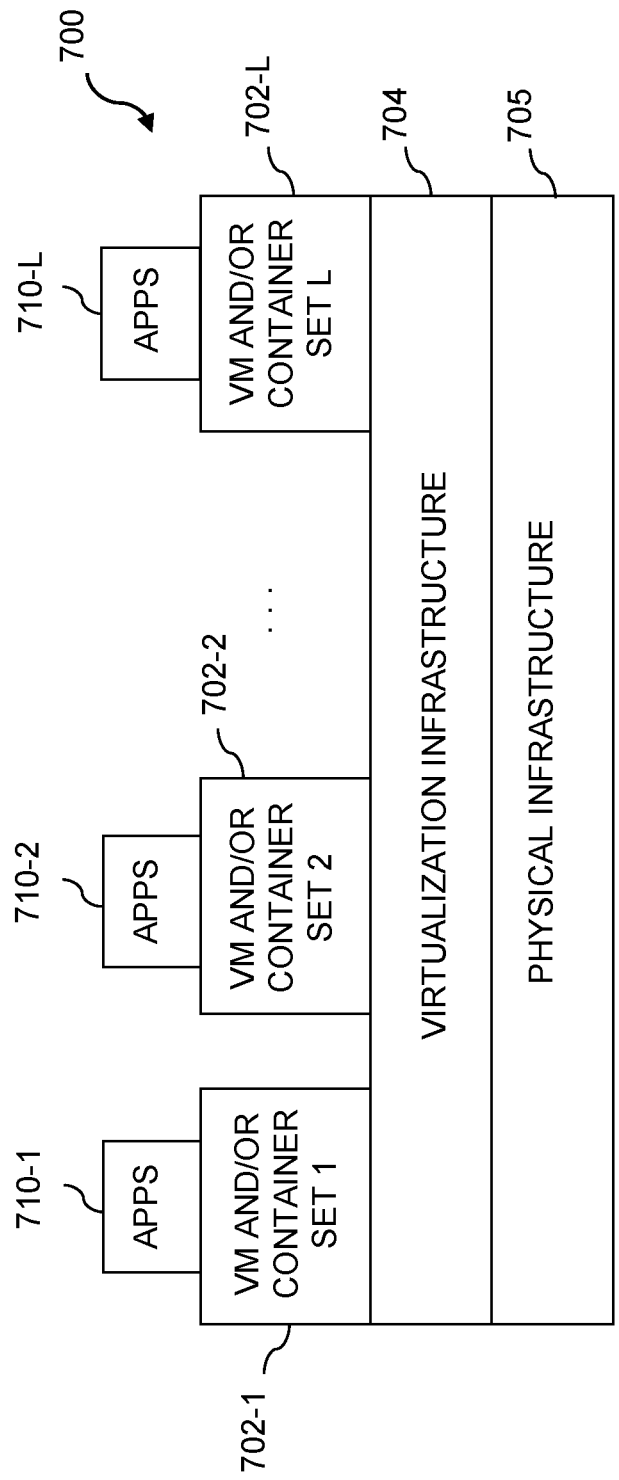
FIGS. 7 and 8 show examples of processing platforms that may be utilized to implement at least a portion of an information processing system in illustrative embodiments.
Figure 8:
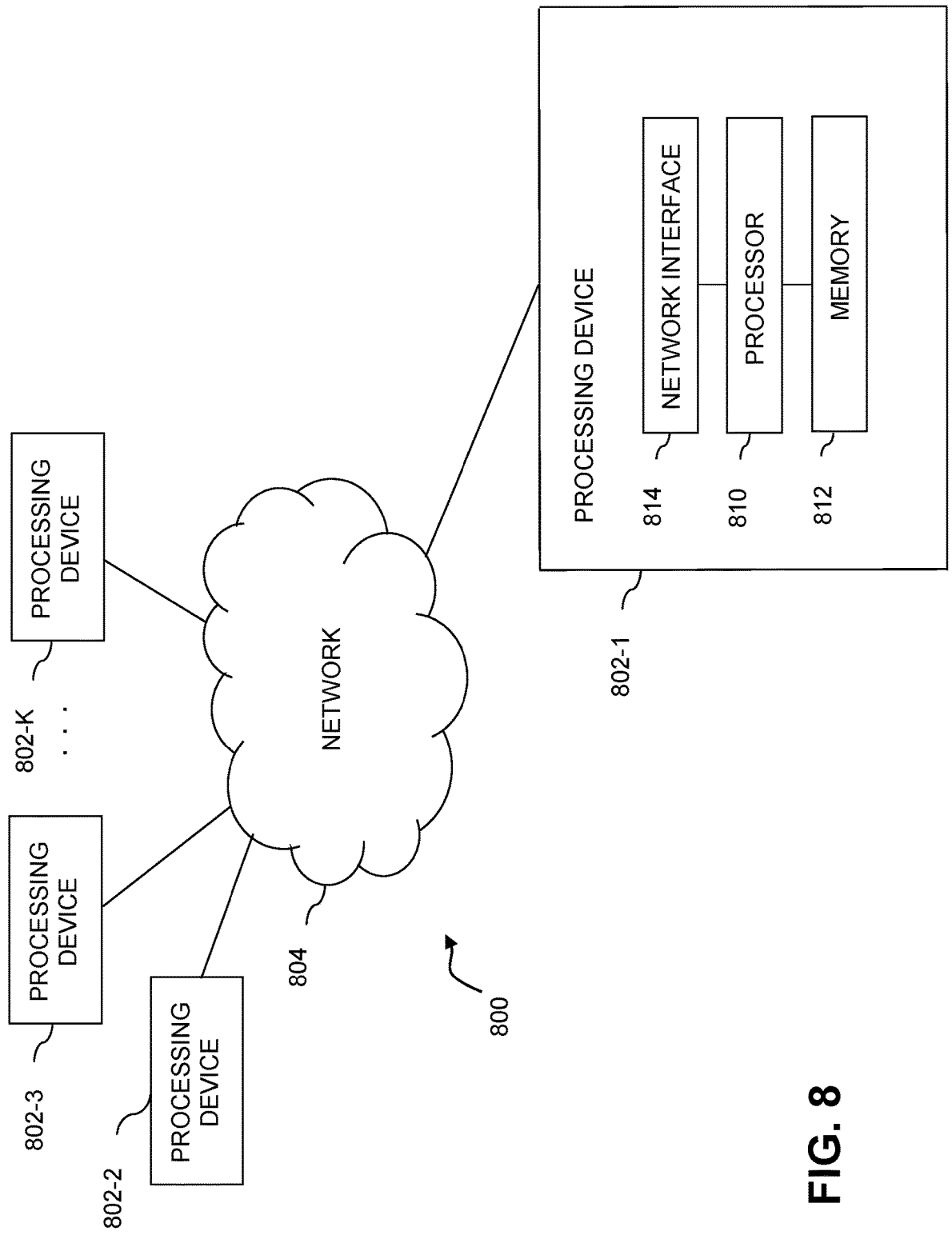

FIG. 7 shows an example processing platform comprising cloud infrastructure 700. The cloud infrastructure 700 comprises a combination of physical and virtual processing resources that are utilized to implement at least a portion of an information processing system (e.g., a system including one or more user devices 102). The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of an example user device 102 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of an information processing system (e.g., a system including one or more user devices 102) and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and an information processing system (e.g., a system including one or more user devices 102) may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in an information processing system (e.g., a system including one or more user devices 102). Such components can communicate with other elements of such an information processing system over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing systems and user devices deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   automatically detecting, using one or more machine learning facial recognition techniques, at least a portion of at least one face within a given proximity of a user device;
   automatically performing a comparison, using one or more machine learning facial recognition techniques, of the detected portion of the at least one face with one or more facial images attributed to a set of one or more trusted individuals;
   automatically performing one or more security-related actions with respect to the user device upon determining, based at least in part on the comparison, that the detected portion of the at least one face exhibits at least a threshold level of distinctiveness relative to each of the one or more facial images attributed to the set of one or more trusted individuals; and
   automatically reversing at least a portion of the one or more performed security-related actions with respect to the user device upon failing to detect, for a predetermined length of time, at least a portion of at least one face within the given proximity of the user device that exhibits at least the threshold level of distinctiveness relative to each of the one or more facial images attributed to the set of one or more trusted individuals;
   wherein the method is performed by at least one processing device comprising a processor coupled to a memory.

2. The computer-implemented method of claim 1, wherein automatically detecting comprises automatically detecting at least a portion of at least one face upon mapping, using the one or more machine learning facial recognition techniques, at least a user-configurable percentage of the at least one face.

3. The computer-implemented method of claim 1, wherein automatically detecting comprises automatically detecting at least a portion of at least one face upon observing at least a portion of the at least one face for at least a user-configurable amount of time.

4. The computer-implemented method of claim 1, wherein the one or more machine learning facial recognition techniques comprise at least one Eigenface-based technique.

5. The computer-implemented method of claim 1, wherein the one or more machine learning facial recognition techniques used in automatically detecting the at least a portion of at least one face within the given proximity of the user device differ from the one or more machine learning facial recognition techniques used in automatically performing the comparison.

6. The computer-implemented method of claim 1, wherein the one or more machine learning facial recognition techniques used in automatically detecting the at least a portion of at least one face within the given proximity of the user device comprise the same one or more machine learning facial recognition techniques used in automatically performing the comparison.

7. The computer-implemented method of claim 1, wherein automatically performing the one or more security-related actions comprises generating a secure view and displaying the secure view via a screen of the user device.

8. The computer-implemented method of claim 7, wherein generating the secure view comprises deactivating one or more user-configurable applications.

9. The computer-implemented method of claim 7, wherein generating the secure view comprises enabling execution of one or more user-configurable applications.

10. The computer-implemented method of claim 7, wherein generating the secure view comprises enabling modified execution of one or more user-configurable applications in accordance with one or more user instructions.

11. The computer-implemented method of claim 7, further comprising:
deactivating the secure view and removing the secure view from the screen of the user device in response to one or more user actions.

12. The computer-implemented method of claim 1, wherein automatically performing the one or more security-related actions comprises at least one of pausing one or more audio-visual applications executing on the user device and stopping one or more audio-visual applications executing on the user device.

13. The computer-implemented method of claim 1, wherein automatically performing the one or more security-related actions comprises at least one of pausing one or more audio applications executing on the user device and stopping one or more audio applications executing on the user device.

14. The computer-implemented method of claim 1, further comprising:
modifying the set of one or more trusted individuals based at least in part on user input.

15. A non-transitory processor-readable storage medium having stored therein program code of one or more software programs, wherein the program code when executed by at least one processing device causes the at least one processing device:
to automatically detect, using one or more machine learning facial recognition techniques, at least a portion of at least one face within a given proximity of a user device;
to automatically perform a comparison, using one or more machine learning facial recognition techniques, of the detected portion of the at least one face with one or more facial images attributed to a set of one or more trusted individuals;
to automatically perform one or more security-related actions with respect to the user device upon determining, based at least in part on the comparison, that the detected portion of the at least one face exhibits at least a threshold level of distinctiveness relative to each of the one or more facial images attributed to the set of one or more trusted individuals; and
to automatically reverse at least a portion of the one or more performed security-related actions with respect to the user device upon failing to detect, for a predetermined length of time, at least a portion of at least one face within the given proximity of the user device that exhibits at least the threshold level of distinctiveness relative to each of the one or more facial images attributed to the set of one or more trusted individuals.

16. The non-transitory processor-readable storage medium of claim 15, wherein automatically detecting comprises automatically detecting at least a portion of at least one face upon mapping, using the one or more machine learning facial recognition techniques, at least a user-configurable percentage of the at least one face.

17. The non-transitory processor-readable storage medium of claim 15, wherein automatically detecting comprises automatically detecting at least a portion of at least one face upon observing at least a portion of the at least one face for at least a user-configurable amount of time.

18. An apparatus comprising:
at least one processing device comprising a processor coupled to a memory;
the at least one processing device being configured:
to automatically detect, using one or more machine learning facial recognition techniques, at least a portion of at least one face within a given proximity of a user device;
to automatically perform a comparison, using one or more machine learning facial recognition techniques, of the detected portion of the at least one face with one or more facial images attributed to a set of one or more trusted individuals;
to automatically perform one or more security-related actions with respect to the user device upon determining, based at least in part on the comparison, that the detected portion of the at least one face exhibits at least a threshold level of distinctiveness relative to each of the one or more facial images attributed to the set of one or more trusted individuals; and
to automatically reverse at least a portion of the one or more performed security-related actions with respect to the user device upon failing to detect, for a predetermined length of time, at least a portion of at least one face within the given proximity of the user device that exhibits at least the threshold level of distinctiveness relative to each of the one or more facial images attributed to the set of one or more trusted individuals.

19. The apparatus of claim 18, wherein automatically detecting comprises automatically detecting at least a portion of at least one face upon mapping, using the one or more machine learning facial recognition techniques, at least a user-configurable percentage of the at least one face.

20. The apparatus of claim 18, wherein automatically detecting comprises automatically detecting at least a portion of at least one face upon observing at least a portion of the at least one face for at least a user-configurable amount of time.

* * * * *